Aug. 4, 1959 K. J. BUSCH 2,898,482

MAGNETIC RADAR PULSE DURATION-CLIPPER AND DAMPER

Filed June 13, 1955

INVENTOR
K. J. BUSCH

BY George C. Ford

ATTORNEY

United States Patent Office 2,898,482

Patented Aug. 4, 1959

2,898,482

MAGNETIC RADAR PULSE DURATION-CLIPPER AND DAMPER

Kenneth J. Busch, Chatham Township, Morris County, N.J., assignor to Bell Telephone Laboratories, Incorporated, New York, N.Y., a corporation of New York Application June 13, 1955, Serial No. 514,866

11 Claims. (Cl. 307—108)

This invention relates to improvements in pulse modulators, and more particularly, in pulse modulator damping circuits.

As is known, damping circuits are often used in pulse modulators for absorbing residual energy left over after each pulsing of the load to minimize reverse polarity surges and after-pulsing. Customarily such a circuit employs an inverse vacuum diode for diverting the unwanted energy into a damping resistor. As a result of the use of the diode, these circuits have had a number of disadvantages and shortcomings. One is that the damping action is rather slow because this tube, being a unidirectional device, cannot start to divert energy until a current reversal occurs after the end of the keying pulse. This is particularly objectionable if the modulator is used to key a radar magnetron, since the power pulse will end even sooner than the keying pulse when the amplitude of the latter drops below the magnetron sustaining potential. Therefore, the total time interval from the end of the radio frequency pulse to the start of damping, let alone to its completion, may be sufficient to seriously hamper certain types of systems operation, such as some in which radars are protected against jamming by using closely-time-spaced multiple-pulsing of their transmitters. Another disadvantage is that the low impedance path continuously offered by the damping circuit across a modulator in the direction of diode conduction would impair the operation of certain kinds of multiple-pulsing systems which employ a number of modulators if these circuits were to be used in them. Thus, as will be seen, if a plurality of direct-current line-type modulators having inverse diode damper circuits were to be connected in parallel across a single magnetron in an effort to set up a very desirable type of such a system, it would be found that this path in each of them might seriously interfere with the proper operation of the system by the by-passing of keying pulse energy from one or more of the others into its own pulse-forming network, thereby preventing the major part of their keying energy from going usefully into energizing the oscillator as intended. Moreover, a vacuum diode has a relatively short useful life as compared to most other pulser components; its need for cathode heating complicates the circuit and power supply requirements; it is relatively unsuited to permanent potting in insulating oil; and its internal resistance may cause the damping action to be relatively slow even after it finally does get its late start.

Accordingly, it is an object of this invention to improve pulse modulator damping circuits so as to avoid the above-mentioned disadvantages.

As is also known, in many uses of a pulse modulator it is desirable to vary the duration of the "on" intervals during which it actuates the load device, for example, in a radar wherein the detection range can be extended on the one hand by increasing the duration of the radio frequency power pulses, and on the other hand, the resolution between targets can be increased by reducing it.

However, in the past it has been very difficult to provide for changing the radio frequency pulse durations of radars, and, unfortunately, particularly of airborne radars wherein the need is greatest. The reason for this is that in the past the magnetron, or other transmitting tube, has customarily been permitted simply to continue to oscillate until it used up enough of the keying pulse energy for quenching to occur spontaneously. Since the duration of the radio frequency power pulse has therefore been as fixed as the energy content of its keying pulses, either different complete pulsers have had to be switched into and out of circuit with the magnetron to change the power pulse duration or at least different pulse-forming networks have had to be switched into and out of circuit with a single pulser. In either case, this required the use of bulky, vacuum-protected, high voltage switches in addition to the duplication of pulser circuitry. Even so, satisfactory performance was not attained, since safety usually required that the changes include brief intervals of complete low-voltage input power shutdown so that the pulser or network which is to be switched out of circuit can be fully discharged first, and therefore they could not be made quickly enough for certain fast-moving air operations.

Accordingly, it is a further object of this invention to further improve a pulse modulator damping circuit so that upon acting it can divert enough energy to the damping resistor to terminate the energization of the load device and that it can do so at any one of a number of different selectable times before the end of the keying pulse to vary the duration of the "on" interval of the load irrespective of the energy content of the keying pulse.

In general, according to this invention a specific kind of switch, namely, a saturable core inductor, is used to divert unwanted residual keying pulse energy to the damping resistor. It is designed to do so only when saturated by the keying pulse or "forward" current to the end that it will perform its switching action within the duration of the keying pulse. Thus, damping occurs after a period of delay which is precisely controllable and repeatable and is always measured from the leading edge of the keying pulse, rather than from any other time reference which may be available in the system containing the modulator, and if the damping is effective to determine the duration of the "on" intervals of the load they will always be the same independently of system instabilities such, for example, as jitter in the periodicity of recurrence of radar keying pulses.

To provide for easy selection from among a given number of different radio frequency pulse durations the circuit may be arranged so that the damping resistor either is connectable across the modulator over any one of an equal number of saturable core inductors having individual saturation times related to the respective pulse durations, or is permanently connected across the modulator over all of the inductors in series, if, in the latter case, means are provided for short-circuiting, and thereby bypassing, all but any one of them which may be appropriate at any given time for the pulse duration then desired.

Since the inductors act and can be made to reset very quickly, it will be possible to connect a plurality of pulsers in parallel across one magnetron with virtually no possibility of undesirable energy interchanges occurring between them over their damper circuits as well as to achieve very much smaller time spacings between multiple pulses than ever before.

Figure 1:
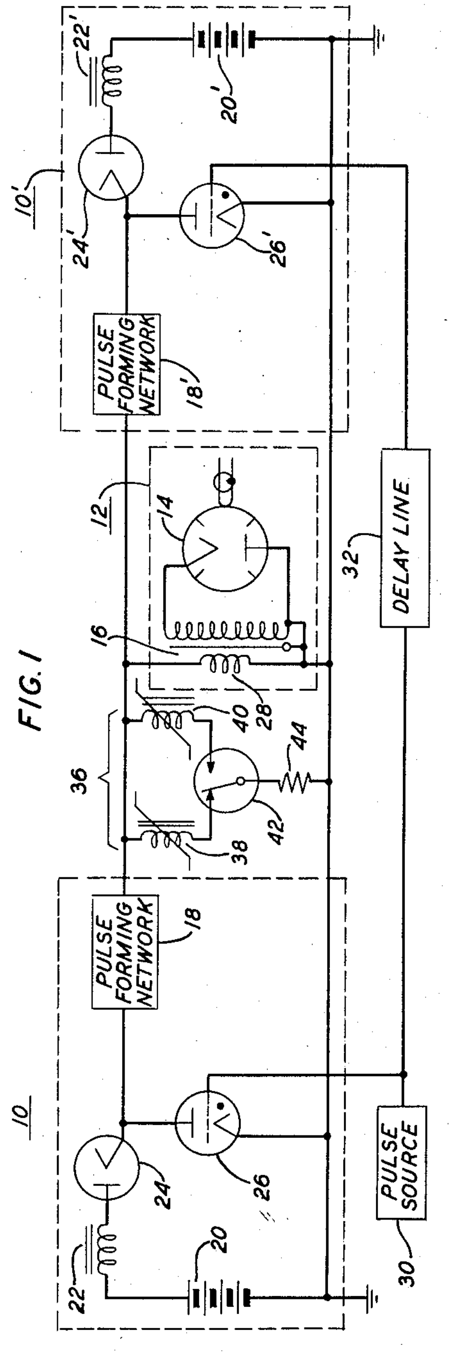
Fig. 1 is a circuit diagram of one embodiment of this invention.

Fig. 1 shows a double pulsing arrangement in which two line-type pulsers 10, 10' are connected in parallel across a common load 12 comprising a magnetron 14 and an impedance-matching transformer 16. Each of the pulsers comprises a pulse-forming network 18, 18' and a circuit for resonance-charging it from a source of direct potential 20, 20' through a choke coil 22, 22' and a diode 24, 24' poled to prevent the network from discharging back into the source after the completion of a charging surge. In addition, it comprises a gas switch tube 26, 26' which responds to a train of positive switching pulses from a source 30 to periodically discharge the network 18, 18' through the primary 28 of the transformer 16, each switching pulse being suitably delayed in a delay line 32, before being applied to the switch tube 26' of the pulser 10' to produce the desired time separation between the paired keyings of the magnetron.

As is known, a damper circuit using an inverse diode, and connected, for example, across switching tube 26 or switching tube 26' in Fig. 1, is frequently used in a single line-type pulser to dispose of residual energy which in particular remains stored in its pulse forming network after each discharge thereof into the load, and obviously it may sometimes be desirable to continue to use them when such pulsers are combined in a multiple-pulsing arrangement as shown in Fig. 1. However, the result may be quite unsatisfactory apart from the limitations which the relatively slow action of these damping circuits would impose on the permissible closeness of spacing between the power pulses. The reason for this, is that each time that the switch tube of any pulser but the one which produces the first keying pulse, e.g., each time that the tube 26' of the pulser 10' would become conductive its cathode current, which should only move over the low impedance path feeding the primary 28, would also find another path over the damping circuit of any other pulser 10 that preceded in producing a keying pulse and into its discharged pulse-forming network 18. The resulting loss of energy from each keying pulse but the first in each close-spaced group would either prevent the magnetron from firing at all in response thereto or would prevent it from producing its intended peak power output, in addition to the fact that the keying pulse which is spuriously received by a pulser might cause a spurious keying of the magnetron by it if its associated thyratron had not had time to quench.

These difficulties are eliminated in arrangements wherein, according to the present invention, a saturable core inductor is used for controlling the diversion of residual energy into the damping resistor, because the inductor can easily be adapted to saturate and then be reset so rapidly and in such quick succession that it acts as an open switch almost continuously, that is, for all of the time except an extremely short damping interval occupying a small terminal portion of the keying pulse.

In addition to the fact that it (*a*) provides earlier and sometimes faster damping action, and (*b*) avoids the above-mentioned undesirable energy transfers between parallel-connected pulsers, this type of circuit also provides such completeness of damping action that oftentimes a single one of them can be located with equal success at any one of a number of positions across the pulser, at which separate damping circuits were employed in the past, and in each case it will absorb substantially all of the capacitively stored residual energy present at all of the positions. Because of this, in multiple pulsing arrangements a single damping circuit of this kind can be made to serve all of the pulsers by connecting it across their common output circuit, as shown at 36 in Fig. 1, at which point it will effectively eliminate residual energy stored in all of the plurality of pulse-forming networks 18, 18' as well as that stored in the distributed capacitance of the common transformer 16 and in the inter-electrode capacitance of the common magnetron. While the circuit 36 could also be connected across the secondary side of the transformer such an arrangement is not to be preferred because of the much higher voltages involved and the need for isolating it from the cathode heater circuit (not shown) of the magnetron.

A selection of different radio frequency pulse durations is made possible in the Fig. 1 apparatus by providing the circuit 36 with a plurality of saturable core inductors 38, 40 and a high voltage, e.g., vacuum protected, switch 42 for connecting the damping resistor 44 across the common output circuit over any individual inductor selected in accordance with the radio frequency pulse duration desired. Each of the inductors is designed, in accordance with principles well known in the art, to have a saturation time when subjected to a keying pulse which is substantially equal to a respective one of the different desired radio frequency power pulse durations. As a result, at a predetermined time during each keying pulse, depending on the setting of the switch 42, suddenly the resistor 44 will be effectively connected directly across the common output. Since its resistance value is chosen to be near to and preferably a little lower than the conducting impedance of the magnetron as seen at the location of the circuit 36, this will approximately double the load imposed on whichever pulser is then engaged in producing the keying pulse thereby causing the voltage across the magnetron to drop to less than its sustaining potential and terminating its oscillation. With the magnetron thus rendered non-conducting, the resistor 44 alone will afford a nearly ideal termination for the above-mentioned pulser as is necessary for rapid damping. Since the relationship of the surge frequency to the value of the resistor 44 will determine whether the damping is critical or above and therefore whether it can be completed before a current reversal, it is apparent that it might be possible to control this aspect of the damping action by suitably designing each of the inductors with respect to their saturated inductance values. In practice this has proven to be the case. However, it is actually preferable to design them with a value of saturated inductance which results in slightly less than critical damping since in this way a limited current reversal can be made to occur which is large enough to serve the useful purpose of resetting the saturated inductor and yet not so large as to produce objectionable surge effects such as after-pulsing of the magnetron.

Figure 2:
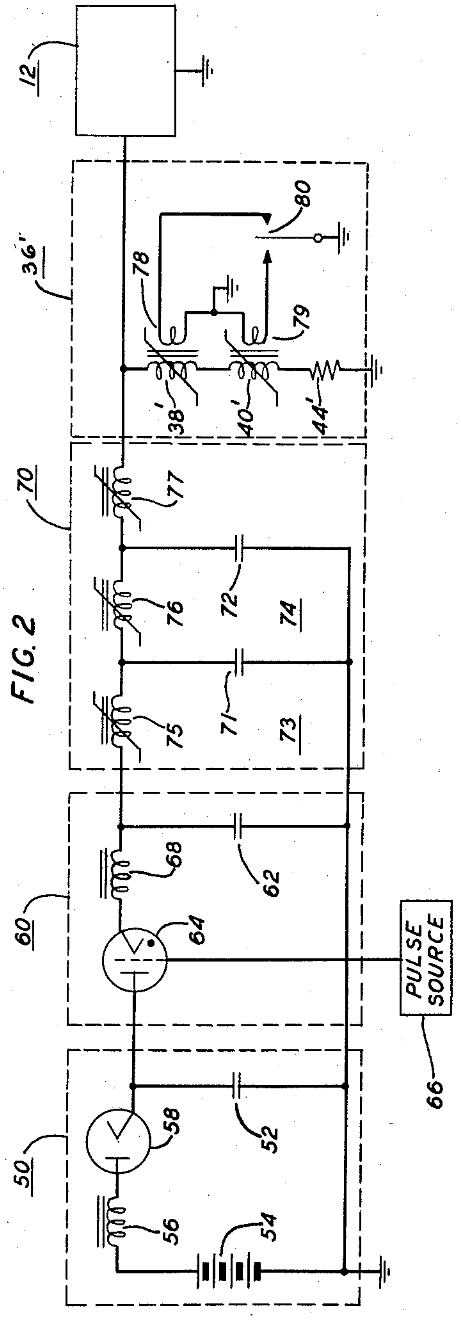
Fig. 2 is a circuit diagram of another embodiment.

The pulser shown in Fig. 2 has an input section 50 comprising a storage capacitor 52 which, like the networks 18, 18' of Fig. 1, is adapted to be resonance charged from a direct potential source 54 through a choke 56 and a guard diode 58 to serve as a low impedance source of a predetermined amount of electrical energy at double the original source potential. This section feeds a second section 60 which acts to establish the pulse repetition frequency of the pulser by periodically discharging the capacitor 52 into another capacitor 62 through a gas-filled switch tube 64 under control of accurately timed trigger pulses from a source 66. A suitable inductor 68 is connected between the capacitors 52 and 62 to cause the energy transfers to take place as resonance surges and therefore to be substantially complete. Section 60 is followed by a transfer chain section 70 which acts to withdraw each charge received on the capacitor 62, shortly after it reaches its peak value, to transfer it in rapid succession to the storage capacitor 71, 72 of two pulse-forming stages 73, 74, over respective saturable core inductors thereof 75, 76, and finally into a load 12 (like that of Fig. 1) over an output saturable core inductor 77. In doing this the section 70 progressively modifies the voltage waveform of each impulse of energy which it receives from the section 60 to form it into a keying pulse having one or more of the following characteristics: greatly steepened leading and trailing edges; a greatly reduced duration; and an increased peak amplitude, depending on what may be required of the pulser in any particular case and how certain circuit constants of the section 70 were chosen to meet these requirements according to principles set forth below.

Prior art transfer chains, e.g., those used in prior art series-type magnetic pulsers, have only been suitable for re-forming input energy impulses by reducing the durations thereof through steepening their leading and trailing edges, this inflexibility resulting from the fact that certain of their parameters have always been related to each other in the same way, namely, the capacitors used in their successive stages have all had the same value of capacitance while their inductors have had progressively smaller "saturation flux linkages," as a result, for example, of using inductors having progressively smaller cores and/or reduced numbers of turns (since, in general, the number of saturation flux linkages of any inductor equals the product of the number of turns in its coil and the total number of lines of flux contained in its core when the latter is saturated). These relationships have always been preserved since they were deemed essential to attaining pulse (duration) shortening in the transfer chain, and since no other suitable pulse shortening means was available. While the operation of such transfer chains will not be described in detail herein, since it is well known, reference is made to co-pending United States application Serial No. 475,029, filed December 14, 1954, for any helpfulness which it may have in better understanding the present invention. I have found that the possibility of reducing the pulse duration at the damping circuit eliminates the need for continuing to preserve the above-mentioned relationships and therefore permits modifications of transfer chains which afford other kinds of pulse re-forming as well as other advantages.

One possible departure from prior art practice, for example, would be to use (1) transfer chain capacitors 62, 71, 72 having progressively smaller values of capacitance in combination with (2) successive inductors 75, 76, 77 whose numbers of saturation flux linkages do not diminish at the usual rate, if at all. These two modifications will respectively afford two important advantages, namely, that a pulse will grow in amplitude as it travels along the chain and that the inductors will be automatically reset without the use of direct current biasing, both at the cost of but one disadvantage which can be overcome by the damping circuit, namely, that there will either be less (or no) pulse shortening in the transfer chain, or possibly even pulse lengthening.

The biasing which can be eliminated by the second modification has hitherto always been essential to the resetting of the inductors in any pulser, such as that of Fig. 2 with its unidirectional devices 58 and 64, in which a reversal of current flow through the inductors cannot occur over a return path through the prime energy source 54. This has been quite a burdensome requirement since windings which must be added to the inductors when biasing is used complicates their design and reduces their unsaturated inductance values and the direct current power requirements are usually very substantial. The manner in which the modification in question can cause suitable currents to circulate internally in the chain to accomplish resetting without the need for biasing even if no back current can move out of the chain in the direction of the source 54 can be explained as follows: If each successive saturable core inductor be designed with substantially more than its customary amount of saturation flux linkages, e.g., with an increased number of turns and therefore increased amount of unsaturated inductance in a case where its core material is unchanged, it will continue to act as an open switch a little longer than usual in each cycle of operation and therefore will impose a greater than usual delay on its discharge of the capacitor which precedes it into that which follows it. As a result, the charge on the preceding capacitor will have more time to force a reverse current back through the preceding inductor and, if it has sufficiently more, this reverse current will continue until that inductor is reset. If, in addition, the capacitors of the successive stages be made progressively smaller in capacitance to achieve the above-mentioned amplitude growth, it should then be borne in mind that the amount of saturation flux linkages required for the saturable core inductor in each stage to attain a desired amount of delay in switching is a direct function of the amplitude of the pulse which it must hold off for that time and that therefore the successive inductors will have to be designed with even greater increases in the values of their saturation flux linkages and it may be necessary, therefore to tolerate an actual increase in pulse duration rather than a reduced amount of (or no) pulse shortening. Moreover, it should be noted as another factor which has a similar effect that when the larger of two capacitors is resonance-discharged into the smaller in a circuit like the transfer section 70, the former will be left with some of its initial charge and that this will act to oppose the resetting action by the back potential on the latter, thereby further increasing the amount of time delay which is required for such resetting to be completed and, as a consequence, either further reducing any pulse shortening or further extending any pulse lengthening which may occur in the stage. However, if efficiency, and therefore the amount of pulse energy which is wasted in the damping circuit, is not a critical consideration, this will be of little import, since the pulses can easily be shortened at 36' as desired.

The change that needs to be made in an inductor to attain the present novel resetting can also be described in terms of making a suitable increase in its "guard interval," its "guard interval" being, as is known, a small extra amount of delay which is deliberately designed into it, as a safety factor over the minimum value determined by calculations as suitable for maximum pulse shortening, to avoid the possibility of premature switching due to factors such as inaccurate estimates of stray and distributed reactances, uncertainties in the values of components due to manufacturing limitations, and variations in the values of critical constants during operation due to changes in ambient conditions.

Another possible departure from prior practice is to use transfer chain capacitors having progressively larger values of capacitance in combination with the usual arrangement of inductors having progressively smaller values of unsaturated inductance. This modification will be useful where pulse shortening, rather than pulse amplitude growth, is desired along with automatic resetting of the inductors without biasing where no back current can flow from the transfer chain to the prime energy source. In this case the resetting takes place because each time that there is a resonance transfer of energy between two capacitors in the chain the one which is discharged not only is completely discharged but, in addition, acquires a small amount of opposite charge, i.e., charge of the proper polarity, to aid in producing a current reversal in the inductor which interconnects the two capacitors. Even though the magnitude of this charge is relatively small it may easily suffice for the completion of resetting since it will be retained in the capacitor and therefore will exert its effect during a substantial part of the ensuing inter-pulse interval.

Though the saturable core inductors 38', 40' of the Fig. 2 damping circuit 36' are permanently connected in series with each other and with the damping resistor 44' across the output of the pulser each of them is adapted to be effectively short-circuited individually so that the saturation flux linkages of the other can alone determine the time, during each keying pulse, at which the power pulse will be artificially terminated. To this end, each inductor is provided with a closely-coupled secondary winding, 78, 79 having a relatively very small number of turns, one of its ends permanently grounded, and its other end adapted to be grounded by actuation of a switch 80. An advantage of this arrangement is that because of the very low turns ratios of the windings 78, 79 relative to the windings of the inductors 38', 40' with which they are respectively associated and their adequate insulation against direct electrical connection thereto, dangerously high voltages will not be present at the switch 80 which therefore can be safely located at any position desired, for example, on a radar instrument panel in the cockpit of an aircraft. Obviously, the circuit 36' can be operated with both contacts of the switch open to provide power pulses of a longer duration than those which will be produced in either of the closed positions of the switch.

What is claimed is:

1. Apparatus comprising a load device having an input circuit, means including a generator of electrical pulses of a predetermined duration for periodically energizing said device with said pulses over said circuit, and a damping circuit for periodically dissipating residual energy remaining in said apparatus after each periodical energization of said device, said damping circuit being connected across said input circuit and including a saturable core inductor and a damping resistor connected together in series, said inductor having an appropriate number of saturation flux linkages for its core to be saturated after a predetermined time interval within the duration of one of said pulses upon the application of said pulse to said circuits.

2. Apparatus as in claim 1 in which said damping circuit includes a plurality of saturable core inductors connected across said input circuit in series with each other and with said resistor, each inductor having a value of a number of saturation flux linkages which is appropriate as set forth in claim 1 but is different from that of any of the others, switching means, and means controllable by the switching means for effectively short-circuiting all but any selected one of said inductors at any given time to determine which of said inductors will then be effective in said damping circuit.

3. As a sub-combination of a system comprising a pulse-modulated load: a series-type pulse generator comprising a first storage capacitor; means for periodically charging said first capacitor; and a transfer chain including a second storage capacitor having a predetermined charge time, a saturable core inductor responsive to each charging of said first capacitor to discharge it into said second capacitor, and a second saturable core inductor responsive to each charging of said second capacitor to discharge it toward the output of said generator and having a predetermined saturation time, said predetermined saturation time of said second saturable core inductor being greater than said predetermined charge time of said second capacitor by an appropriate time interval sufficient to allow a portion of the energy stored in said second capacitor to reset said first inductor before said energy stored in said second capacitor is discharged through said second inductor toward the output of said generator.

4. As a sub-combination of a system comprising a pulse-modulated load, a series-type pulse generator comprising a storage capacitor; means for periodically charging the capacitor; and a transfer chain including a second storage capacitor and a saturable core inductor responsive to each charging of the first-mentioned capacitor to discharge it into said second capacitor, said second capacitor having a substantially smaller value of capacitance than said first-mentioned capacitor.

5. A series-type pulse generator comprising a storage capacitor; means for periodically charging the capacitor; and a transfer chain including a second storage capacitor and a saturable core inductor responsive to each charging of the first-mentioned capacitor to discharge it into said second capacitor, said second capacitor having a substantially larger value of capacitance than said first-mentioned capacitor.

6. Apparatus comprising a generator of electrical pulses of a predetermined duration and a damping circuit connected across the output of said generator and including a saturable core inductor and a damping resistor connected together in series, a two-terminal load device having a predetermined driving point impedance, means interconnecting said output of said generator and said load device said inductor having an appropriate number of saturation flux linkages for its core to be saturated within the duration of one of said pulses upon application thereof to said circuit and to said load device, said damping resistor having a value substantially equal to the magnitude of said driving point impedance.

7. Apparatus comprising an oscillator tube having a predetermined conducting impedance and having an input circuit, said input circuit comprising an impedance-matching pulse transformer having primary and secondary windings, means including a generator of electrical pulses of a predetermined duration for periodically energizing said oscillator tube with said pulses over said circuit, and a damping circuit for periodically dissipating residual energy remaining in said apparatus after each periodical energization of said oscillator tube, said damping circuit being connected across one of said windings and including a saturable core inductor and a damping resistor connected together in series, said inductor having an appropriate number of saturation flux linkages for its core to be saturated after a predetermined time interval within the duration of one of said pulses upon the application of said pulse to said circuits, and said resistor having a resistance value nearly equal to the resistive component of said conducting impedance as seen across one of said windings.

8. Apparatus comprising a load device having an input circuit, means including a generator of electrical pulses of a predetermined duration for periodically energizing said device with said pulses over said circuit, and a damping circuit for periodically dissipating residual energy remaining in said apparatus after each periodical energization of said device, said damping circuit being connected across said input circuit and including a saturable core inductor and a damping resistor connected together in series, said inductor having an appropriate number of saturation flux linkages for its core to be saturated after a predetermined time interval within the duration of one of said pulses upon the application of said pulse to said circuits, said damping circuit further including at least one additional saturable core inductor having a different but similarily appropriate number of saturation flux linkages and switching means for substituting said additional saturable core inductor for said first-mentioned inductor in said damping circuit.

9. Apparatus comprising a load device having an input circuit, a plurality of generators of electrical pulses of a predetermined duration for successively and recurrently energizing said device, said plurality of pulse generators being connected in parallel across said input circuit, and a damping circuit for periodically dissipating residual energy stored in said apparatus immediately after each successive energization of said device, said damping circuit being connected across said input circuit and comprising a saturable core inductor and a damping resistor connected together in series, said saturable core inductor having a preresolved saturation time, said preresolved saturation time of said saturable core inductor being substantially equal to said duration of said electrical pulses.

10. A series-type pulse generator comprising a storage capacitor; means for periodically charging said capacitor; a transfer chain including a second storage capacitor having a predetermined charge time; a first saturable core inductor responsive to each charging of said first-mentioned capacitor to discharge it into said second capacitor; and a second saturable core inductor responsive to each charging of said second capacitor to discharge it toward the output of said generator thereby creating an electrical pulse at said output, said second saturable core inductor having a predetermined saturation time, said predetermined saturation time of said second saturable core inductor being greater than said predetermined charge time of said second capacitor by an appropriate time interval sufficient to allow a portion of the energy stored in said second capacitor to reset said first saturable core inductor before said discharge of said second capacitor toward the output of said generator; and a pulse-duration clipper circuit for determining the time duration of said pulse at said output of said generator, said clipper circuit including a saturable core inductor having a predetermined saturation time and a resistor connected in series with said last-mentioned inductor across said output of said generator, said time duration of said pulse being determined by said saturation time of said last-mentioned inductor.

11. A series-type pulse generator comprising a storage capacitor; means for periodically charging the capacitor; a transfer chain including a second storage capacitor, said second capacitor having a substantially smaller value of capacitance than said first-mentioned capacitor; a saturable core inductor responsive to each charging of the first-mentioned capacitor to discharge it into said second capacitor and a second saturable core inductor responsive to each charging of said second capacitor to discharge it toward the output of the generator, said second inductor having such a number of saturation flux linkages that it provides a long enough guard interval before discharging the second capacitor for the charge thereon to have time to reset said first inductor, and that the transfer chain does not afford maximum pulse shortening; and a pulse-duration clipper circuit including a saturable core inductor and resistor connected together in series across the output of the generator.

References Cited in the file of this patent

UNITED STATES PATENTS

| | | |
|---|---|---|
| 2,416,111 | Maxwell | Feb. 18, 1947 |
| 2,419,201 | Crump et al. | Apr. 22, 1947 |
| 2,608,654 | Street | Aug. 26, 1952 |
| 2,652,502 | Melville et al. | Sept. 15, 1953 |

FOREIGN PATENTS

| | | |
|---|---|---|
| 154,760 | Australia | Feb. 1, 1951 |